R. K. ORTT.
LAWN MOWER.
APPLICATION FILED OCT. 18, 1913.
1,134,899.
Patented Apr. 6, 1915.
2 SHEETS—SHEET 1.
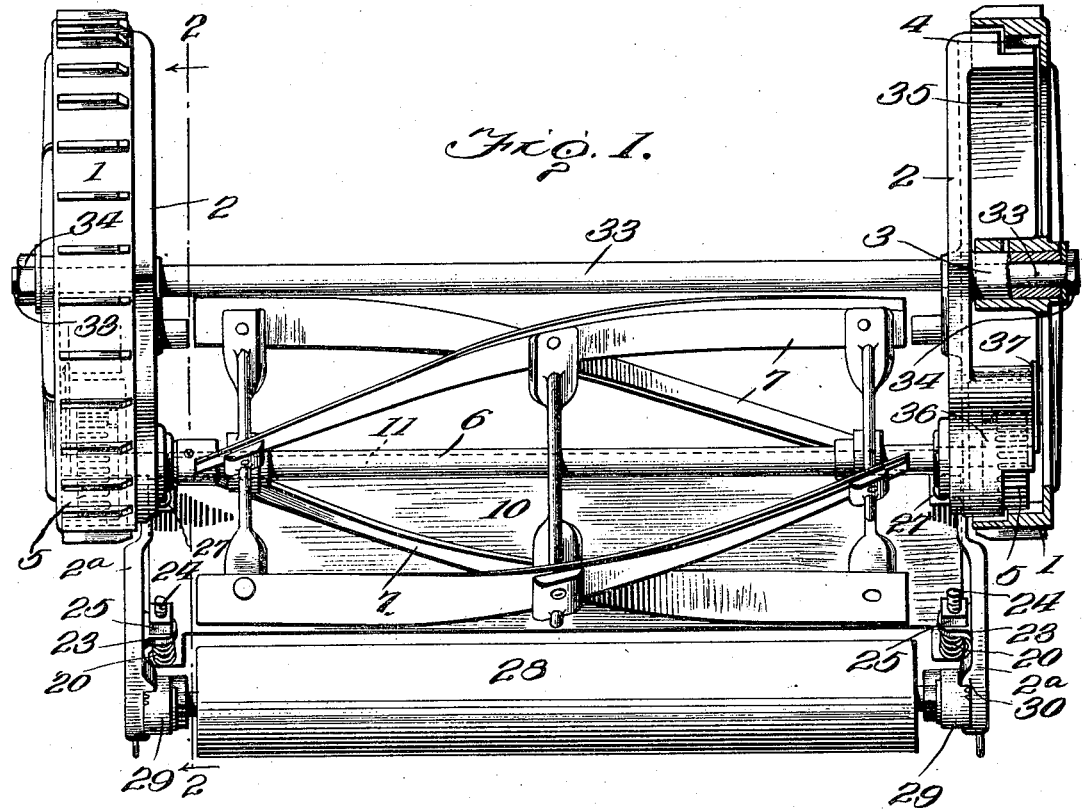
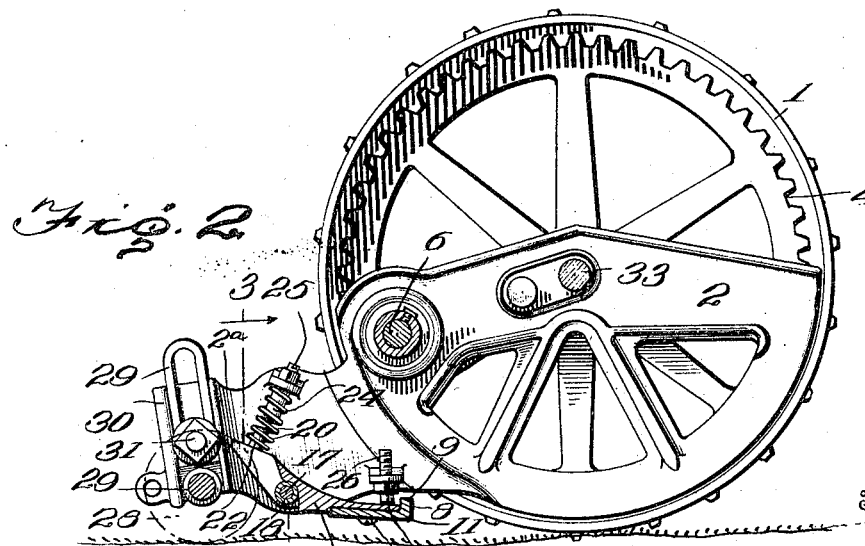

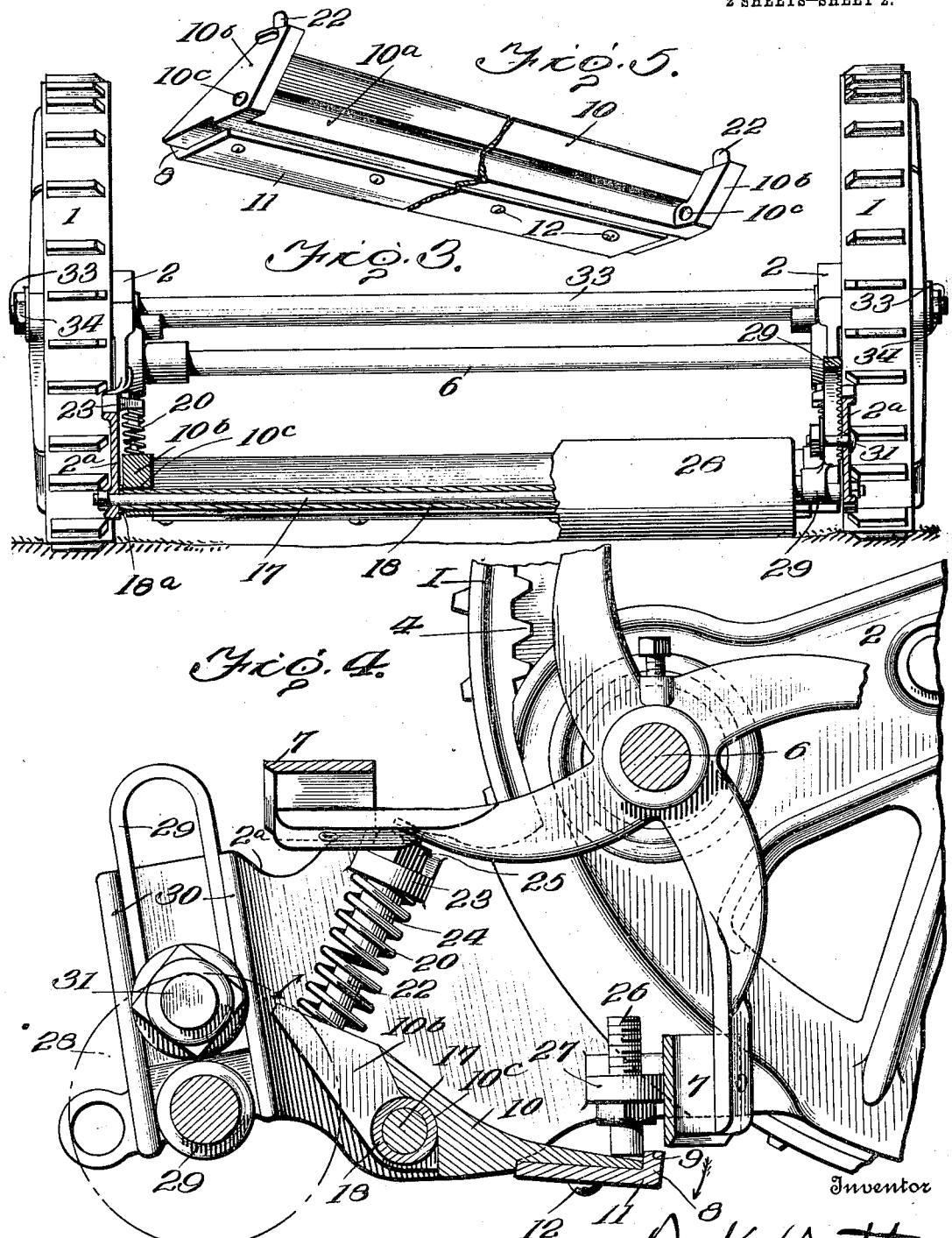

UNITED STATES PATENT OFFICE.

ROWLEY K. ORTT, OF DIXON, ILLINOIS.

LAWN-MOWER.

1,134,899.  Specification of Letters Patent.  Patented Apr. 6, 1915.

Application filed October 18, 1913. Serial No. 795,959.

*To all whom it may concern:*

Be it known that I, ROWLEY K. ORTT, a citizen of the United States, residing at Dixon, Lee county, Illinois, have invented certain new and useful Improvements in Lawn-Mowers; and I do hereby declare the following to be a full, clear, and exact description of the invention, such as will enable others skilled in the art to which it appertains to make and use the same.

This invention relates to certain improvements in mowing machines; and the objects and nature of the invention will be readily understood by those skilled in the art in the light of the following explanation of the accompanying drawings illustrating what I now believe to be the preferred embodiment or mechanical expression from among other possible constructions and arrangements within the spirit and scope of the invention.

An object of the invention is to provide certain improvements in mowing machines, of the rotary-cutting-reel lawn-mower type whereby the stationary or horizontal knife will be yieldingly held to or cushioned in operative position with respect to the cutting knives of the rotary cutter reel, and whereby said relatively fixed knife is rendered readily adjustable toward and from its operative position to take up wear or to suit varying service conditions.

A further object of the invention is to provide certain improvements in arrangements and constructions of parts and elements whereby an improved and highly satisfactory rotary cutter lawn mower will be produced.

The invention consists in certain novel features in construction, and in combinations and arrangements as more fully and particularly set forth and specified hereinafter.

Referring to the accompanying drawings;—Figure 1, is a plan of a lawn mower built in accordance with my invention, one of the ground wheels being shown in horizontal section so that the frame side receiving said wheel will appear in top plan, the pinions on the ends of the cutter reel shaft being indicated by dotted lines. Fig. 2, is a vertical section taken in the plane of the line 2—2, Fig. 1. Fig. 3, is a vertical section taken in the plane of the line 3—3, Fig. 2, the blades and arms of the cutting reel being omitted. Fig. 4, is a detail section taken transversely of the cutting reel shaft and on a larger scale than that of Fig. 2. Fig. 5, is a detail bottom perspective of the bed or head carrying the stationary blade.

In the particular embodiment of my invention illustrated by the accompanying drawings, I show a pair of alined driving or ground wheels 1, confined to rotate on hollow bosses or journals 3, integral with and projecting outwardly from the frame sides or plates 2. The rims or treads of these wheels are formed by annular flanges projecting inwardly toward said sides and overhanging portions thereof and formed with internal gears 4. These gears are relatively narrow so that each rim or flange is formed with a relatively smooth annular surface between its edge and its internal gear, although my invention is not so limited, nor is my invention limited to the manner of mounting the drive wheels. The internal gears 4, of the drive wheels mesh with pinions 5, on the ends of the rotary cutter shaft 6. The shaft 6, carries the cutting reel comprising spirally arranged cutters or blades 7, and said shaft is mounted in the frame sides and projects therethrough to receive the pinions 5, removably arranged on the ends of the shaft in mesh with the internal gears of the drive wheels and operatively coupled to the cutter reel shaft through the medium of any suitable ratchet or other mechanism the rotary cutter reel will be rotated when the machine is moved forwardly, but so that the pinions will run loosely on the ends of said shaft without rotating the same, when the machine is moved rearwardly.

I provide a relatively fixed or stationary blade or knife to coöperate with the cutters or blades of the rotary reel in severing the grass or other vegetation. This stationary, bed, or wiper knife consists of a bladeholder or head 10, extending between the rear end portions of the frame sides and provided with and carrying the blade 11. This blade 11, is arranged longitudinally of the head at the front edge portion thereof and projects upwardly and forwardly therefrom so that the blades of the rotary cutter will successively sweep the top front longitudinal edge 9, of the blade 11 and coöperate therewith in cutting as will be understood by those skilled in the art. The blade 11, is removably clamped to the under side of the head by one or more screws 12, passing upwardly through holes in the rear portion of the blade and entering threaded sockets in the under portion of the head. The under side of the front portion of the head is preferably formed with a longitudinal socket to receive said blade, while the blade is preferably formed with a longitudinal lip 8, rising from its front edge and fitting the front edge of the head and forming the cutting edge 9.

The head is pivotally supported and is adapted to rock on its horizontal pivot to elevate and depress the front longitudinal cutting edge 9, of the blade, and is yieldingly supported or upheld to normally maintain said cutting edge at its limit of upward movement, i. e. in operative cutting position. In the present instance, the head is carried by and rockable on an axis arranged longitudinally thereof and extending between and secured to the rear end portions of the frame sides and serving also to rigidly connect, brace and clamp together said portions of the frame sides. For instance, I show said end portions of the frame sides formed with transverse perforations and at their inner faces having cups or sockets 18$^a$, around said perforations. A removable straight stiff cylindrical tube or pipe length 18, extends between said portions of the frame sides and at its ends fits or centers in said sockets, and a removable tie bolt or rod 17, extends through said perforations and said pipe length and is provided with a head and nut at the outer surfaces of said frame sides to rigidly clamp the frame sides against the pipe ends and thereby fixedly clamp the pipe between the frame sides and thereby form a strong rigid structure. Obviously, my invention is not limited to employing the pipe length as the same result can be accomplished by employing the tie bolt or rod with stops or shoulders to engage the inner surfaces of the frame sides.

The under side of the head 10, is preferably, formed with a longitudinal groove or depression 10$^a$, loosely receiving the pipe, and at its ends the head is formed with rearwardly extending depending projections, ribs or flanges 10$^b$, having perforations 10$^c$, alined with said groove 10$^a$, and forming bearings loosely receiving said pipe so that the head is rockable on the pipe. The pipe is arranged at the under side of the head between the front and rear edges of the head.

The head is yieldingly held with its blade at the limit of upward movement toward the rotary cutting reel by expansive coiled springs 20, abutting the upper faces of the rearwardly extending end projections 10$^b$, of the head and fitting around lugs 22, extending up from the projections, and at their upper ends abutting lugs or ears 23, projecting inwardly from and rigid with the rear end portions of the frame sides. The springs are confined to the ears 23, by adjustable bolts 24, projecting longitudinally into the springs and extending through the ears and confined thereon by nuts 25. These coiled springs bear down on the rear portion of the bed and thereby constantly tend to depress the rear of the bed and elevate the front portion of the bed which carries the blade and thereby will constantly maintain the blade yieldingly upheld at its limit of upward movement toward the cutters of the rotary reel. The limit of upward movement of the blade is determined by the vertically disposed longitudinally adjustable stop screws 26, carried by and extending through and vertically adjustable in ears 27, projecting inwardly from the frame sides. The lower ends of these screws abut the upper faces of the front end corners of the head and thereby limit the upward movement of the cutting edge of the blade. These screws can be adjusted to elevate or depress the normal position of the cutting edge of the blade to attain and to maintain the desired coöperating relation between said edge of the blade and the cutters of the rotary reel.

The springs backing or cushioning the rockable head and its blade maintain a yielding engagement between said blade and the cutters of the rotary reel whereby an exceedingly efficient cutting action is attained, and furthermore, the springs permit the head to rock under abnormal pressure such as might be caused by foreign bodies catching between the blade and a cutter of the rotary reel. Material advantages are attained by thus providing a blade that will yield or give in a direction away from a cutter of the rotary reel should a piece of wire or other hard substance become caught between the blade and cutter which otherwise would be liable to seriously damage the parts engaged thereby.

The head is preferably comparatively wide and is usually transversely concaved at its upper face so that the cutters of the rotary reel can sweep upwardly and rearwardly thereover to carry the cut grass rearwardly therefrom.

In rear of the head I provide a roller 28, to uphold the rear end of the frame of the mower, and this roller is preferably carried by and mounted in the lower ends of brackets 29. The brackets 29, are vertically elongated and are formed with longitudinal slots. These brackets are confined in vertical or longitudinal adjustment, in vertical slideways 30, formed at the inner faces of the rear ends of the frame sides, and bolts 31, adjustably secure the brackets in said slideways and to said frame sides. These bolts extend through the longitudinal slots of the brackets so that when the bolts are loosened the brackets can be adjusted vertically to vary the vertical position of the roller with respect to the rear end of the mower frame, whereby the cutting reel and the stationary or bed blade can be brought closer to or farther from the surface of the earth.

If so desired, the abutting surfaces of said brackets and the frame sides can be toothed or notched approximately as shown.

The front portions of the frame sides are connected and braced by a rigid rod 33, having shoulders at its end portions against which the inner surfaces of the frame sides abut, while said rod is formed with reduced ends projecting removably through the frame sides and through the hollow bosses 3, of the frame sides, while nuts and washers 34, are arranged on the projecting outer ends of the rods to tightly fit against the outer ends of the bosses to rigidly lock the frame sides together and to confine the driving wheels on said bosses. This rod in effect forms and constitutes the rigid or fixed axle of the machine, and if so desired, a propelling handle, not shown, can be coupled thereto, or abut thereagainst, or other means can be suitably attached to the machine for propelling the same. The frame sides or plates 2, are usually similar and are arranged at the inner sides of the lower halves of the wheels, leaving the upper halves of the inner sides of the wheels and their gears open for inspection, oiling and cleaning. The body, front or main portion of each side is approximately semicircular in form to conform to the lower half of the adjacent drive wheel and is formed with an outwardly projecting semicircular flange 35, arranged within and spaced from the wheel rim to cover the lower half of the inner side of the rim.

The fixed axle of the machine extends between the top edge portions of said semicircular front or main portions of the frame sides. The rotary cutting reel shaft is arranged in rear of the fixed axle and extends between and is mounted in the top portions of the rear parts of said main portions of the sides. Said top rear portions of the sides are formed at their outer sides with boxes or compartments 36, receiving the pinions in mesh with the gears of the drive wheels and the pawl and ratchet connections between said pinions and the shaft, and the otherwise open outer sides of these boxes are closed by removable plates 37.

The frame sides are formed with approximately flat rearward extension 2ª, between which the stationary horizontal blade and its head and the roller are arranged and by which said parts are supported at the rear of the machine.

It is evident that various changes, variations and modifications might be resorted to without departing from the spirit and scope of my invention, and hence I do not wish to limit myself to the exact disclosures hereof.

What I claim is;—

In a lawn mower, in combination, frame sides, a rotary cutting reel, operating means therefor, a frame-side spacing-and-clamping tie and axis-forming connection, a vertically rockable bed arranged between said frame sides over and supported by and rockable on said connection and having a front longitudinal cutting edge coöperating with said cutting reel, said sides provided with vertically adjustable stops engaging the lower front corners of said bed to limit the upward movement of the front edge of said bed, said bed formed with depending end flanges having alined bearing openings for said connection and whereby said bed is held down on said connection, the under side of said bed between said depending flanges having a longitudinal depression for said connection and alined with said openings, said flanges being extended rearwardly and upwardly, and coiled compression springs arranged at the inner surfaces of said sides and bearing down on said extended portions of said flanges, said sides provided with rigid portions forming abutments for the upper ends of said springs.

In testimony whereof I affix my signature, in presence of two witnesses.

ROWLEY K. ORTT.

Witnesses:
EVERETT DUTCHER,
GERTRUDE CASTLES.